(12) United States Patent
Hruschka

(10) Patent No.: US 12,494,126 B2
(45) Date of Patent: Dec. 9, 2025

(54) METHOD AND DEVICE FOR DETERMINING A COLLISION PROBABILITY OF A VEHICLE WITH AN OBJECT IN A THREE-DIMENSIONAL SPACE

(71) Applicants: Volkswagen Aktiengesellschaft, Wolfsburg (DE); KTM AG, Mattighofen (AT)

(72) Inventor: Clemens Markus Hruschka, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 363 days.

(21) Appl. No.: 18/015,016

(22) PCT Filed: Jun. 11, 2021

(86) PCT No.: PCT/EP2021/065775
§ 371 (c)(1),
(2) Date: May 9, 2023

(87) PCT Pub. No.: WO2022/012826
PCT Pub. Date: Jan. 20, 2022

(65) Prior Publication Data
US 2023/0316924 A1    Oct. 5, 2023

(30) Foreign Application Priority Data

Jul. 14, 2020   (DE) .......................... 102020208779.2

(51) Int. Cl.
*G08G 1/16*   (2006.01)
*G08G 5/80*   (2025.01)
*G08G 7/02*   (2006.01)

(52) U.S. Cl.
CPC ............. *G08G 1/166* (2013.01); *G08G 1/165* (2013.01); *G08G 5/80* (2025.01); *G08G 7/02* (2013.01)

(58) Field of Classification Search
CPC .......... G08G 1/166; G08G 1/165; G08G 5/80; G08G 7/02; A61K 40/4262
See application file for complete search history.

(56) References Cited

U.S. PATENT DOCUMENTS

2004/0024528 A1\*   2/2004  Patera ...................... G08G 5/80
                                                    340/961
2008/0312832 A1\*  12/2008  Greene ................... G08G 1/166
                                                    701/301

(Continued)

FOREIGN PATENT DOCUMENTS

CN        105843778 A      8/2016
CN        110488806 A     11/2019

(Continued)

OTHER PUBLICATIONS

Hu (Traffic Accident Prediction Using 3-D Model-Based Vehicle Tracking) IEEE Transactions On Vehicular Technology, vol. 53, No. 3, May 2004 (Year: 2004).\*

(Continued)

*Primary Examiner* — Anne Marie Antonucci
*Assistant Examiner* — Jingli Wang
(74) *Attorney, Agent, or Firm* — Peter Zura; LOZA & LOZA, LLP

(57) ABSTRACT

Determining a collision probability of a vehicle with an object. A three-dimensional position and orientation of the vehicle and the object is detected. The vehicle is approximated by at least one first geometrical element, that includes a part of the vehicle. The same is done for the object. A first error and a second error is determined in relation to the geometrical element for the vehicle or object. A Minkowski (Continued)

difference is formed for each combination of the at least one first geometrical element with the at least one second geometrical element. A third error is standardized via a transformation. The transformation serves to calculate calculation elements. The collision probability of the vehicle with the object is determined on the basis a spatial union of the calculation elements.

20 Claims, 4 Drawing Sheets

(56) References Cited

U.S. PATENT DOCUMENTS

| | | | |
|---|---|---|---|
| 2012/0143487 A1 | 6/2012 | Giovannini et al. | |
| 2015/0284010 A1 | 10/2015 | Beardsley et al. | |
| 2021/0155257 A1* | 5/2021 | Alcazar Olan | ....... B60W 30/09 |

FOREIGN PATENT DOCUMENTS

| | | | | |
|---|---|---|---|---|
| DE | 102009045755 A1 | | 4/2011 | |
| DE | 102016218080 | * | 8/2017 | ............. G08G 1/166 |
| DE | 102017215519 A1 | | 3/2019 | |
| DE | 102018111390 A1 | | 11/2019 | |
| DE | 102018211513 A1 | | 1/2020 | |
| SE | 543781 C2 | * | 7/2021 | ........ B60W 30/0953 |
| WO | WO-0146933 A1 | * | 6/2001 | ............. G08G 5/045 |

OTHER PUBLICATIONS

DE 102016218080 B3 machine translation (Year: 2017).*
PCT/EP2021/065775 International Search Report (Sep. 30, 2021).
DE 102020208779.2. Office Action dated Apr. 21, 2021.
Bernabeau. "Distance computation for rotational and translational motions," 2008 IEEE/RSJ International Conference on Intelligent Robots and Systems, 2008, pp. 2732-2737.
Teo et al. "Computing Danger Zones for Provably Safe Closely Spaced Parallel Approaches." J. Guidance, Control and Dynamics, vol. 26, No. 3 (May-Jun. 2003).
Zhou et al. "Reachable Set Approach to Collision Avoidance for UAVs." 015 54th IEEE Conference on Decision and Control (CDC), 2015, pp. 5947-5952.

* cited by examiner

METHOD AND DEVICE FOR DETERMINING A COLLISION PROBABILITY OF A VEHICLE WITH AN OBJECT IN A THREE-DIMENSIONAL SPACE

RELATED APPLICATIONS

The present application claims priority to International Patent Application PCT/EP2021/065775, to Clemens Markus Hruschka, titled "Method And Device For Determining A Collision Probability Of A Vehicle With An Object In A Three-Dimensional Space," filed Jun. 11, 2021, which further claims priority to German Pat. App. No. 10 2020 208 779.2, filed Jul. 14, 2020, the contents of each being incorporated by reference in their entirety herein.

TECHNICAL FIELD

Some aspects of the present disclosure are directed to technologies and techniques for determining a collision probability of a vehicle with an object in a three-dimensional space. Some aspects of the present disclosure are directed to a device for determining a collision probability of a vehicle with an object in a three-dimensional space. Some aspects of the present disclosure are directed to a computer program product and a computer-readable medium on which the computer program product is stored.

BACKGROUND

The automobile sector is presently undergoing changes. This relates not only to the transformation of a vehicle fleet from combustion engines to electric motors, but also to the transformation from pure automobile manufacturers to mobility service providers. In the future, the interaction with other traffic objects will likewise play an ever-greater role. These other traffic objects include, in particular, also aerial vehicles, such as air taxis or drones. For such mobility services, however, landing processes or docking processes between the domains (road and air space) must be designed to be safe.

In the case of automated flight trajectory planning of an aerial vehicle, in general individual available trajectories must be assessed, and an optimal trajectory must be selected. It is in particular desirable to avoid collisions. For example, environment information is detected with the aid of an integrated sensor system, or communication with other objects in the environment, for example with other vehicles, takes place with the aid of Car-to-X communication. This is often done to assess the situation of the ego vehicle or other vehicle, and to plan an ego trajectory based on this information.

A key challenge in the process is that perception and prediction results are always subject to uncertainty due to the environment being detected by way of sensors and due to the unknown intention of other traffic participants. Even though it is possible to roughly estimate these resulting position uncertainties of the traffic participants and to use these for trajectory planning, this makes trajectory planning considerably more difficult. As a result, the trajectory planning becomes too computationally intensive, making realistic air traffic no longer possible. If the collision probability is estimated based on simplifying assumptions, this usually results in considerable overestimation of the collision probability.

The unexamined patent application DE 10 2017 215 519 A1 describes a method and a device for detecting collisions for a vehicle. In the process, a method that is at least a three-stage method is being employed. Up to three collision checks can be carried out. In the process, surface areas along a section of a movement path of the vehicle are being considered in stages, wherein the surface area in the individual stages is approximated to an actual swath of the vehicle.

The unexamined patent application DE 10 2018 211 513 A1 relates to a device for determining a collision probability of a vehicle with an object. This device is limited to a two-dimensional consideration and to an estimation of the collision probability. A three-dimensional approach often requires a special treatment of the third dimension, which this unexamined patent application does not address. For example, certain calculation steps in the two-dimensional space cannot be readily applied to the three-dimensional space.

The unexamined patent application DE 10 2009 045 755 A1 describes a method and a device for conflict detection. The position, the movement direction and the speed of the ego aerial vehicle as well as of further aerial vehicles in the air space are ascertained based on sensor data. From this, the trajectories of the ego aerial vehicle as well as of the other aerial vehicles are to be formed. A group of possible trajectories of the ego aerial vehicle is computed based on possible changes in direction of the ego aerial vehicle. The group of computed trajectories of the host aerial vehicle is checked as to whether in each case a conflict arises with the trajectory of another aerial vehicle. In the event of a conflict, a piece of information is output to the operator of the ego aerial vehicle.

When operating aerial vehicles, it is in particular necessary to carry out the trajectory planning safely, but also sufficiently quickly. Computing the collision probability of the ego aerial vehicle with other objects forms an important integral part of trajectory planning.

SUMMARY

Some aspects of the present disclosure are directed to computing a collision probability for vehicles in the three-dimensional space more efficient. In particular, a feasible compromise between speediness during the computation of the collision probability and not excessive overestimation of the collision probability is to be achieved.

The determination of the collision probability of trajectories is generally very computationally intensive, since often times no closed or analytical solutions exist for this problem. This is in particular the case when conventional methods for object tracking, such as, for example, the extended Kalman filter, describe object states that are subject to uncertainty with a normal distribution In addition, related solution approaches are often only limited to road traffic or cannot represent complex realities. One method that is frequently employed for computing collision probabilities is based on the so-called Monte Carlo method. This method requires a high number of binary collision checks to be sufficiently accurate, so as to ultimately approximate the collision probability. This, however, results in a very high computing time requirement.

Numerical integration methods are likewise very computationally intensive when using a plurality of discretization points, which are necessary for sufficient quality. Considerable difficulties already emerge during the development of autonomously driving motor vehicles that only move in one plane (cars in road traffic). At present, it is not yet possible to provide a fully autonomous motor vehicle that is also able to cope with complex traffic situations safely and reliably. In the case of vehicles that operate in the three-dimensional space, such as air taxis or drones, the entire trajectory planning must take place not just in one plane, but in the three-dimensional space. If, additionally, aerial vehicles are to be able to operate fully autonomously, a real-time capable computation of the collision probability is accordingly of great importance.

For these reasons, the present disclosure provides technologies and techniques for determining a collision probability of a vehicle with an object in a three-dimensional space. Some aspects of the present disclosure thus relate to a method for determining the collision probability. The vehicle can, in particular, be a drone, an air taxi, a helicopter, an airplane and/or an aerial vehicle. The vehicle can be a motor vehicle. According to the method, a collision probability with an object is to be determined. This object can, for example, be another vehicle, aerial vehicle, motor vehicle, an animal such as a bird, for example, a tree, a building, a semistatic object such as a windsock or a wind vane turning with the wind. A windsock can frequently be encountered at bridges and is usually statically fixed to a pole, the sock itself being movable. Since the windsock per se is movable by virtue of the wind and nonetheless, as a result of being fixed to the pole, is not entirely freely movable, such objects can be referred to as being "semistatic."

Some aspects of the present disclosure relate to a device for determining a collision probability of a vehicle with an object in a three-dimensional space. The three-dimensional space may be considered as a traffic space that is approved for aerial vehicles. The device comprises at least one sensor unit for detecting a three-dimensional position and an orientation of the vehicle and of the object. In addition or as an alternative, the device comprises an interface for receiving information regarding the three-dimensional position and orientation of the vehicle and of the object. The device furthermore comprises a control unit. This control unit is configured to approximate the vehicle by at least one first geometric body, wherein the at least one first geometric body contains a portion of the vehicle. The vehicle can, for example, be underapproximated by the at least one first geometric body. Underapproximating means, in particular, that the at least one first geometric body contains the vehicle only partially, that is, preferably not completely. The approximation can thus denote overapproximation or underapproximation. In the case of overapproximation, the vehicle is in particular contained completely in the at least one first geometric body. The volume of the at least one first geometric body in this case exceeds the volume of the vehicle. The volume of the at least one first geometric body is thus greater than the volume of the vehicle.

The control unit is moreover configured to approximate the object by at least one second geometric body, wherein the at least one second geometric body contains a portion of the object. The description with respect to the approximation, underapproximation and/or overapproximation regarding the vehicle can be analogously applied to the approximation of the object. The object can be overapproximated or underapproximated by the at least one second geometric body. During approximation, the position and/or orientation of the vehicle or of the object may be incorporated in each case.

The control unit is able to determine and/or predefine a first indeterminacy of the at least one first geometric body and a second indeterminacy of the at least one second geometric body. The control unit is configured to take a Minkowski difference for each combination of the at least one first geometric body for the vehicle with the at least one second geometric body for the object. The control unit is furthermore designed to determine a respective third indeterminacy for each Minkowski difference as a function of the first indeterminacy of the at least one first geometric body and the second indeterminacy of the at least one second geometric body. The control unit is configured to standardize the respective third indeterminacy by means of a respective transformation, and to apply the same respective transformation to the respective taken Minkowski difference so as to determine respective computing bodies from the Minkowski difference. The control unit is furthermore configured to determine or to compute the probability of the vehicle colliding with the object based on a set union of the computing bodies or an approximation for the set union.

The sensor unit can comprise multiple sensors. In some examples, the sensor unit may include a temperature sensor, a camera, a LIDAR sensor, a pressure sensor, an ultrasonic sensor and/or a radar sensor. With the aid of the interface, vector data can be received from an external data source, for example. Likewise, information can be received from other vehicles or flying objects via the interface. The device can include a neural network, which enables object recognition. For this purpose, for example, corresponding camera images can be evaluated with the aid of the neural network.

Refinements and embodiments with respect to the first aspect can be applied correspondingly and analogously to the second aspect, and vice versa. In this way, all method features can be interpreted as present device features. This also applies accordingly vice versa.

The control unit can, in some examples, comprise a computer, a microcontroller, an integrated circuit or a neural network. As an alternative, the control unit can comprise a real or virtual network of computers. The control unit can furthermore be designed as a processor or microchip. The control unit can comprise hardware elements or software elements so as to carry out the described method and the refinements thereof. For this purpose, the control unit can additionally access a memory unit. The memory unit can be designed as a permanent memory or as a non-permanent working memory. The control unit can thus comprise a processor unit, which is configured to carry out all embodiments of the method. The processor unit can comprise at least one processor and/or at least one microcontroller and/or at least one field-programmable gate array (FPGA) and/or at least one digital signal processor (DSP) for this purpose. The processor unit can furthermore include program code, which is designed to carry out the embodiment of the method when executed by the processor unit. The program code can be stored in a data memory of the processor unit.

The sensor unit can in particular be designed as an environment sensor system. The environment sensor system is in particular able to generate sensor data or sensor signals that map, represent or reproduce an environment of the vehicle.

Aspects of the present disclosure also relate to a computer program product, encompassing commands which cause the device to carry out the method steps. The computer program product can be present in the form of program code. Corresponding commands can be stored in this program code, which, when executed appropriately, are able to carry out the method steps of claim 1 as well as of all further refinements of the method.

Aspects of the present disclosure likewise relate to a computer-readable medium on which the computer program product is stored. In particular, the computer-readable medium contains the program code including the corresponding commands, which are able to carry out features described in the claims below. The computer-readable medium can be a memory card, a hard drive and another non-volatile memory.

Aspects also encompasses refinements of the method according to the present disclosure which include features described herein in connection with the refinements of the motor vehicle according to the present disclosure. For this reason, the corresponding refinements of the method according to the invention are not described again here.

Aspects also encompass the combinations of the features of the described embodiments.

BRIEF DESCRIPTION OF THE DRAWINGS

Various exemplary embodiments of the present disclosure are described hereafter. In the drawings.

DETAILED DESCRIPTION

Figure 1:
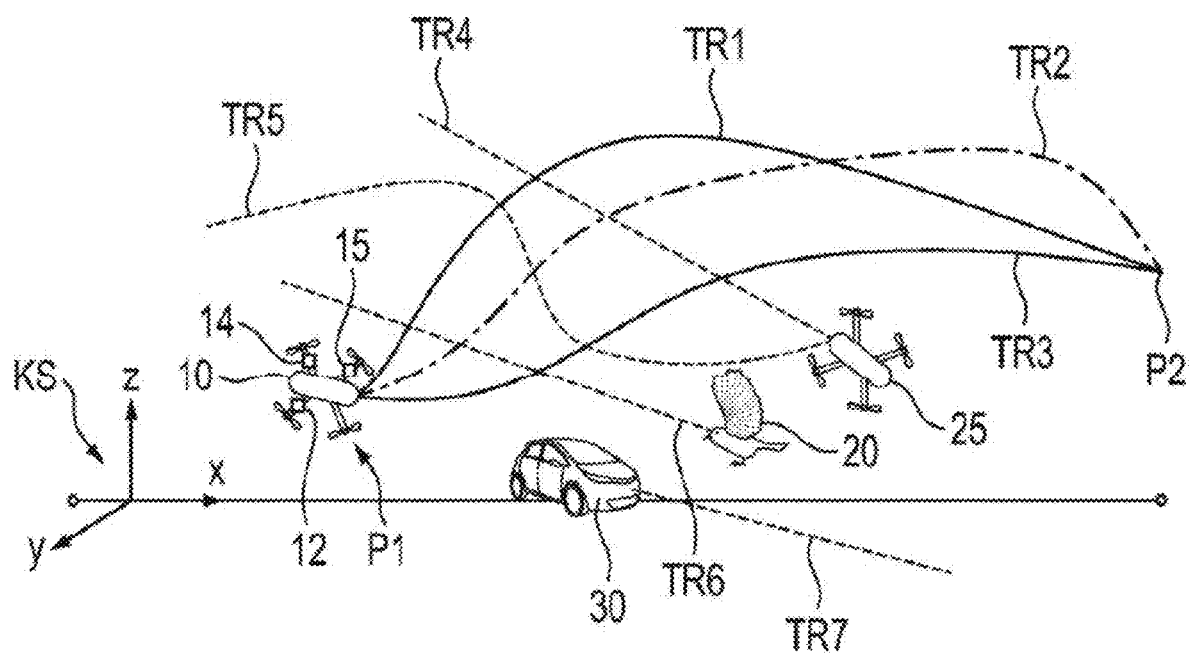
FIG. 1 shows an exemplary illustration of a vehicle together with multiple objects in the three-dimensional space as well as multiple possible trajectories for the vehicle according to some aspects of the present disclosure.

The exemplary embodiments described hereafter are preferred embodiment of the present disclosure. In the exemplary embodiment, the described components of the embodiment in each case represent individual features of the invention which are to be considered independently of one another and which also refine the invention independently of one another and, as a result, shall also be considered to be an integral part of the present disclosure, either individually or in a combination other than the one shown. Furthermore, the described embodiment may also be supplemented with additional of the above-described features of the present disclosure. In the figures, functionally equivalent elements are each denoted by the same reference numerals.

In some examples described herein, a three-dimensional position and orientation of the vehicle and of the object are initially detected and/or received. The three-dimensional position can be detected by a sensor, for example, or by an onboard sensor system of the vehicle itself. In addition, or as an alternative, information for determining the collision probability can be received via an interface of the vehicle. For example, a local wind speed can be received from an external database as information. It may be provided that the three-dimensional position and orientation of the vehicle and of the object are detected, for example, using a sensor unit or an environment sensor system arranged at the vehicle or an onboard sensor system. These pieces of information regarding the three-dimensional position and orientation can be transmitted to the interface. These pieces of information can be taken into consideration or used for determining or computing the collision probability.

The three-dimensional positions of the vehicle and of the object can, in some examples, be expressed in Cartesian coordinates. However, the three-dimensional position can likewise be detected or expressed in other coordinates, such as spherical coordinates, for example. In some circumstances, a corresponding coordinate transformation may be necessary. The orientation of the vehicle and/or of the object can in particular be a three-dimensional orientation. This means, for example, that multiple angles regarding the alignment or orientation of the object and/or of the vehicle may exist. A drone, for example, can have an orientation in an xy plane, at the same time, however, an orientation in an xz plane, and an additionally an ego orientation in the zy plane. The three-dimensional orientation can thus encompass three orientations. A conventional Cartesian coordinate system having the known axes x, y and z can serve as the basis. The z axis can preferably be vertically upward. The vehicle can thus have three degrees of freedom for the position, for example in the form of three Cartesian coordinates (x, y, z), and three additional degrees of freedom for the orientation of the vehicle, for example in the form of three angles (pitch angle, yaw angle, angle of inclination). The vehicle can thus have six degrees of freedom. The same can apply accordingly to the object. The number of orientations can vary along a trajectory. If, for example, a vehicle is landing and thereafter is only moving along one plane (along the ground), in this case only a single orientation suffices. The number of orientations can thus be dependent on the course of the trajectory.

In some examples, the vehicle may be approximated by at least one first geometric body. Approximating the vehicle as used herein can mean representing, closely replicating or approximately modeling the vehicle. The at least one first geometric body can thus represent the vehicle, closely replicate it or approximately model it. The at least one first geometric body includes a portion of the vehicle. This means, in particular, that at least a portion of the vehicle is contained within the at least one first geometric body. During approximation, the three-dimensional position and/or orientation can be taken into consideration. The vehicle can, for example, be approximated by means of multiple first geometric bodies. For example, it can be approximated by two spheres, serving as first geometric bodies. The approximation is preferably carried out analogously with respect to the object. This means that the object is approximated by at least one second geometric body. Again, approximating can denote representing, closely replicating or modeling, as was explained in connection with the vehicle. Likewise, the at least one second geometric body contains a portion of the object. The vehicle and/or the object can be approximated by means of multiple geometric bodies, wherein the multiple bodies can be symmetrical.

If, for example, an object is approximated by three spheres, serving as second geometric bodies, at least a portion of the object is contained within each of these three spheres. The entire object may be contained within these spheres. The same can apply accordingly to the vehicle. Ideally, an axis of symmetry can be defined for a set union of the first bodies. With this, the computing complexity can be reduced. The same can apply accordingly to the second bodies. Preferably, the at least one first and/or second geometric bodies contain the portion of the vehicle and/or of the object which, proceeding from an a priori estimation, is affected during a collision.

In some examples, the vehicle may be underapproximated by the at least one first geometric body. Underapproximating in this context means that the at least one first geometric body contains the vehicle only partially, or not completely. The approximation can thus denote overapproximation or underapproximation. In the case of overapproximation, in this context, the vehicle may be contained completely in the at least one first geometric body. The volume of the at least one first geometric body in this case exceeds the volume of the vehicle.

In some examples a first indeterminacy of the at least one first geometric body and a second indeterminacy of the at least one second geometric body are determined and/or predefined. This may result from the finding that all measured data of sensors and externally received pieces or portions of information are subject to errors and are thus subject to imprecision or uncertainty. Indeterminacy in this connection means, in particular, imprecision, ambiguity, incertitude, measurement error, data uncertainty, uncertainty and/or a tolerance range. The first and second indeterminacies may relate primarily to sensor data as well as externally received information. The first indeterminacy preferably relates to the position and/or orientation of the at least one first geometric body. In this way, the first indeterminacy can relate indirectly to the vehicle. The first indeterminacy can result from inertial uncertainty of the vehicle.

In the case of multiple first geometric bodies, each of these first geometric bodies can have a dedicated first indeterminacy. Each geometric body can have its own indeterminacy. The multiple indeterminacies can be different; however, they may be identical so as to simplify the method. Each geometric body can in each case have exactly one first or exactly one second indeterminacy. The same can apply accordingly to second geometric bodies and/or the second indeterminacies. The second indeterminacy preferably relates to the position and/or orientation of the at least one second geometric body. The second indeterminacy can thus be interpreted as an (indirect) measure of the uncertainty of the position and/or orientation of the object. The first indeterminacy with respect to the position of the first geometric body can, for example, be expressed in the form of a respective interval for each space coordinate. Accordingly, further intervals including angular information can express or represent the first indeterminacy for the orientation of the first geometric body or vehicle. Embodiments with respect to the first indeterminacy can apply accordingly to the second indeterminacy.

These first and second indeterminacies are preferably taken into consideration during the further course of the processing so as to determine a transformation which is necessary for determining the collision probability. Based on an imprecision of measured data or received information, in particular the first and/or second indeterminacies of the at least one first and/or at least one second geometric bodies can be determined. In this way, an imprecision in the sensor data as well as the externally received data may accordingly propagate to the geometric bodies in the form of the first and/or second indeterminacies.

In some examples, the position of the geometric bodies may not be 100 percent unambiguously established or defined. If, for example, the vehicle is approximated by means of a sphere, this sphere, due to the indeterminacy, may have shifted accordingly, depending on the extent of the indeterminacy. The spatial position of this sphere thus cannot be exactly stated as a number, but only as an interval or a region in the space. The larger this interval is selected, the more reliably the sphere or a portion thereof can be located therein. During the determination of the first and/or second indeterminacies, it can be provided to take a Gaussian normal distribution into consideration. If the first or second indeterminacy, for example, cannot be determined since, for example, an error source is not known, the first or second indeterminacy can be predefined. If a piece of sensor information is determined, for example, based on two sensors, a corresponding error propagation can be taken into consideration. Here, in particular the known Gaussian error propagation can be used with multiple measurement errors.

In a next step, a (respective) Minkowski difference is taken for each combination of the at least one first geometric body with the at least one second geometric body. The at least one first geometric body preferably represents the vehicle. The at least one second geometric body preferably represents the object. This can mean, for example, that intervals, instead of position points, are used with respect to the indeterminacy for the position of the vehicle and/or of the object for the method. The intervals can be confidence intervals. By way of uncertainties with respect to the vehicle or the object, the first and/or second indeterminacies of the vehicle and/or of the object can be inferred. As an alternative or in addition, the same can apply accordingly to the orientation. The Minkowski difference is in particular no conventional difference, such as is known in the field of real numbers. The Minkowski difference can, in particular, be described by the following formula:

$$A \ominus B := \{a-b : a \in A, b \in B\} \quad \text{Formula 1}$$

In this example. A and B are in each case a set of points, a and b are in each case elements of the sets A and B. In the method, in particular the respective point sets of the particular geometric bodies are used, instead of the sets A and B.

A relative distance between two bodies can be determined by means of the so-called Minkowski difference. The Minkowski difference is, in particular, the set of points that arises when for each point of the set A the differences with the points of a second set B are calculated. Taking the Minkowski difference can be regarded as a coordinate transformation in relative coordinates, in which a relative distance is expressed.

The Minkowski difference can likewise be interpreted as a Minkowski sum. In this case, the subtraction A−B is defined as the sum of the sets A and −B. The Minkowski difference is in particular helpful for quickly recognizing potential collisions. However, one must bear in mind that, due to the first and second indeterminacies, the position of the geometric bodies is not exactly determined. With this, the Minkowski difference likewise has an indeterminacy, which is referred to as the third indeterminacy. In the two-dimensional space, the Minkowski difference is a surface area, and in multidimensional spaces, the Minkowski difference is accordingly likewise multidimensional. In the three-dimensional space, the Minkowski difference is thus in particular three-dimensional. For simplification reasons, however, the Minkowski difference is frequently only explained in the two-dimensional context.

In a further step, a respective third indeterminacy may be determined for each Minkowski difference as a function of the respective first indeterminacy of the at least one first geometric body and the respective second indeterminacy of the at least one second geometric body. The third indeterminacy is preferably determined by adding the first indeterminacy and the second indeterminacy. The third indeterminacy is, in particular, a sum of the first and second indeterminacies. In particular multiple Minkowski differences result in the case of multiple first or second geometric bodies. In particular, in each case exactly one first and exactly one second geometric body can be assigned to each Minkowski difference. These two geometric bodies can, in particular, have exactly one first indeterminacy and exactly one second indeterminacy. Based on these two indeterminacies, the corresponding third indeterminacy is preferably ascertained or determined. In the case of multiple Minkowski differences, in this way accordingly (an equal number of) multiple third indeterminacies can be determined. Each of these third indeterminacies relates in particular to the associated Minkowski difference. The third indeterminacy is in particular required during the further course of the method so as to determine a transformation or arithmetic operation for determining the collision probability. In this way, established mathematical methods can be used during the determination or computation of the collision probability during the further course of the method. This can result in a simpler and more efficient computation of the collision probability.

In a further step, the respective third indeterminacy may be standardized using a respective transformation. In the process, the respective transformation is ascertained or determined. In the three-dimensional space, standardizing the third indeterminacy may result in a unit sphere around the origin. The same transformation is applied in each case to the respective taken Minkowski difference so as to determine respective computing bodies from the particular Minkowski difference. It is likewise possible to standardize multiple third indeterminacies. If only a single Minkowski difference is present, accordingly only a single computing body is determined. Standardizing the third indeterminacy can mean, in particular, that an associated covariance matrix is converted to a standard normal distribution.

In the case of multiple third indeterminacies, accordingly multiple covariance matrices can in each case be transformed or converted into a standard normal distribution. In this way, it is possible to standardize multiple third indeterminacies. The transformation may be understood as an arithmetic operation, a transformation matrix for the three-dimensional space. The transformation can encompass stretching, translation, compression, distortion, rotation and/or reflection. Thereafter, the transformation required for this purpose in each case is preferably applied to the particular Minkowski difference. The standardization thus serves as the determination of the respective transformation, which derives the associated computing body from the Minkowski difference. Depending on the nature of the transformation, this can result in translation, dilation, distortion, stretching and/or compression of the Minkowski differences.

During the standardization process, in particular a standardization of measured values, an arithmetic mean, a standard deviation and/or a covariance matrix can be taken into consideration. In the two-dimensional space, the standardization can be regarded as a corresponding modification of a density function of the normal distribution. During standardization in the two-dimensional space, the density function or density curve is in particular stretched or compressed so that the standard deviation is one, depending on the spatial direction, wherein the area of the density curve (the probability) overall remains constant. This approach can analogously be applied accordingly to multidimensional distributions. As an alternative, a respective scaling factor can additionally be used for the third or further dimensions.

In some examples, the standardization of a variable in a dimension can be regarded as shifting as well as stretching and/or compression of a normal distribution. During a standardization in multidimensional spaces (dimension greater than two), a separate scaling factor can be used for each dimension. In this way, for example, a distribution having a certain predefined standard deviation can be converted to a different distribution having a corresponding other standard deviation. Since in particular the probabilities represented under the density curve are to remain, the corresponding density functions are accordingly shifted and/or stretched. When a "standardization of the Minkowski difference" is mentioned hereafter, this preferably shall be understood to mean the standardization of the respective third indeterminacy by the corresponding transformation and application of the same transformation to the corresponding Minkowski difference.

The collision probability of a vehicle with an object may be determined based on a set union of the computing bodies or an approximation for the set union. The collision probability may be determined as a function of the set union of the computing bodies or an approximation for the set union. The set union may be configured as a spatial union. The computing body may be configured as a spatial body, such as an ellipsoid, a cuboid and the like. For example, spheres can be transformed into ellipsoids by the transformation. Accordingly, multiple Minkowski differences can be transformed into multiple new computing bodies by the particular transformations, which are determined by the standardization of the particular third indeterminacy.

In three-dimensional space, the Minkowski difference can be configured as a geometric body, similarly to the computing body, wherein the body of the Minkowski difference preferably differs from the body of the computing body. As a result of the particular transformation, in particular the bodies that represent the Minkowski difference are transformed or converted into the new computing bodies. Multiple computing bodies may result accordingly in the case of multiple Minkowski differences. In this way, both the Minkowski difference and the computing body can each be interpreted as point sets in the space or as bodies in the three-dimensional space. In the case of higher dimensions (n-dimensional; n greater than three), this approach can accordingly result in n-dimensional bodies.

The computing bodies may thus differ from the at least one first geometric body and the at least one second geometric body for approximation. The computing bodies can in particular partially overlap or intersect. The collision probability can in particular be determined as a function of a probability density function. For this purpose, in particular an integration or a summation of the probability density function can take place by way of the set union of the computing bodies. In the majority of instances, no analytical integration can be carried out. As a result, a summation by way of the set union is preferably carried out. This summation can take place based on discrete points. The set union can in particular be understood as a mathematical term. Accordingly, it preferably represents a collectivity of the volumes of all bodies of the standardized Minkowski difference, overlapping areas only being counted once. When A and B are to be considered as sets, then set A united with B is the set in which applies:

$$A \cup B = \{x | x \in A \lor x \in B\} \qquad \text{Formula 2}$$

The determination of the collision probability of the vehicle can in particular be computed by means of integration over the spatial area of the corresponding probability density function or functions. The following formula can be used for this purpose, for example:

$$P(C) = \int_D p_z(z) dz \text{ where } D = \{z_E \in Z_E, z_T \in Z_T | \vartheta(z_E) \cap \vartheta(z_T) \neq \emptyset\} \quad \text{Formula 3}$$

$p_z(z)$ is the probability density function, including the first and second indeterminacies for the geometric bodies for the vehicle and the object; $z_E$ is a vector of the vehicle from $Z_E$, which takes the first indeterminacy of the vehicle vector into consideration; $\vartheta(z_E)$ represents an object base volume of the vehicle; $Z_T$, $\vartheta(z_T)$, $z_T$ relate accordingly to the object. $P(C)$ denotes the collision probability here.

This general formula for integration or summation for computing the collision probability can generally be simplified further. This results in the following formula:

$$P(C) = \int_D p_{Z_E}(z_E) p_{Z_T}(z_T) dz_E dz_T | \quad \text{Formula 4}$$

Formula 4 differs from Formula 3 in that a dedicated separate probability density function is used both for the vehicle and for the object. D in Formula 4 can be a volume, which is used to compute the collision probability. D can, for example, be the volume of a bounding box, sphere, prism and the like.

In some examples, formula 4 can be employed when the vehicle and the object operate independently of one another. This is generally also the case. When a drone moves in the air space, for example, this usually occurs independently of a further object, such as a bird. The probability density functions can be designed as multivariate normal distributions. An exemplary normal distribution for a three-dimensional space is provided by the following formula:

$$p_Z(z) = \frac{1}{(2_\pi)^3 \det(\sum)} \exp\left(-\frac{1}{2} \cdot (z-\mu)^T \sum{}^{-1} (z-\mu)\right) \quad \text{Formula 5}$$

$\Sigma$ is the covariance matrix; z in Formula 5 is the respective position vector for the vehicle or object; $\mu$ is the respective expected value.

Such a probability density function can be assumed or computed both for the vehicle and for the object. For calculating Formula 4, initially the two probability density functions can be multiplied, and then the integration can be carried out (numerically). The volume of the spatial union or another volume as an approximation thereof can be used for the integration over the volume. The collision probability of the vehicle with the object can be determined or computed in this way.

Using aspects of the present disclosure, it is possible to compute the collision probability with a considerable computing time advantage compared to a Monte Carlo method as well as other numerical integration methods. The loss of accuracy can be kept relatively low in the process, while enabling real-time capable computation of the collision probability. In particular, for example, a complete trajectory of the object or of the vehicle, including all collision probabilities to be computed, can be achieved within 0.1 seconds. The collision probability can preferably be computed in real time. The advantage of this method compared to the Monte Carlo method increases when a plurality of samples is needed for a required quality in the Monte Carlo simulations, since the described method in particular requires an assessable, constant computing run time.

By way of this method, a real time requirement, in which a large number of different trajectories must be checked for collisions, can also be achieved in complex systems. Instead of binary collision checks of other methods, a quantitative collision probability can be computed instead. Uncertainties that occur can be suitably mapped in a decision process. Overall, a computing run time advantage can be achieved with high accuracy by way of this method. Resulting position uncertainties of traffic participants can be mapped in a collision probability by way of this method and be utilized for trajectory planning. In this way, the risk of a planned trajectory can be estimated and consequently be accordingly minimized. As a result, safe maneuvering of aerial vehicles in the three-dimensional space can be achieved.

An additional or alternative embodiment of the method can provide that volumes of the geometric bodies for the vehicle and for the object are determined as a function of a digital resource. The digital resource can in particular be an available computing power. In addition or as an alternative, the volumes of the bodies can be determined based on a speed of the vehicle and/or of the object. In the case of an aerial vehicle, for example, a body that is arranged at the spot of the aerial vehicle which is oriented in the direction of the heading may be selected. The volume of the body preferably contains the region of the vehicle that would most likely be affected in the event of a collision. The volume of the body can thus preferably be limited to a potential collision spot of the vehicle with another object. In this way, a value can be determined for the collision probability with still acceptable accuracy, even if relatively little computing power is available. It is relatively unlikely, for example, that a drone collides with the object in the rear region.

The object and the vehicle can each be approximated in a sphere shape. In this case, the body is designed as a sphere in each case. The vehicle and the object can be overapproximated by multiple spheres. The respective volumes in the set union thereof contain the entire vehicle or the entire object in each case. In the case of overapproximation by multiple spheres, an increase in volume that is still acceptable is preferably achieved. Further vehicles in adjoining driving areas or aviation corridors can usually pass without problems. An approximation using spherical bodies has the advantage that the orientation can in each case be neglected. This is primarily due to the special symmetry of the sphere. A rotation of an ideal sphere results in the same sphere. The size or the volume of the geometric bodies can likewise be determined based on a speed of the velocity or of the object. It tends to be useful to provide larger volumes of the bodies at a higher speed of the vehicle. Depending on the application and safety requirements, it is also possible for vehicles with relatively little computing power to determine the collision probability so as to determine a corresponding flight trajectory. This could be the case, for example, with non-critical package deliveries.

An additional or alternative embodiment of the method provides that the at least one first body completely contains the vehicle, and the at least one second body completely contains the object. The at least one first body preferably relates to the vehicle. The at least one second body relates to the object. As an alternative, it may be provided that the at least one first body underapproximates the vehicle, and the at least one second body underapproximates the object. As a result of the underapproximation, in particular the volume represented in each case by the vehicle or the object is approximated to be smaller than the vehicle volume and/or the object volume. As a result of the underapproximation, in particular in each case the at least one first and/or second geometric bodies are in particular selected or determined in such a way that the volumes thereof are smaller than the volumes of the vehicle or object. Consequently, the computed collision probability is underestimated in the case of underapproximation. This can preferably be provided when low computing power is available. Depending on an available digital resource or computing power, overapproximation or underapproximation can be provided for.

In the case of overapproximation, the vehicle can, for example, be completely bounded by an accordingly large sphere. Likewise, multiple smaller spheres overall may completely contain the vehicle in the volumes thereof. The same can apply accordingly to the object. Instead of spheres, it is possible to use other bodies such as cuboids, cylinders, prisms, pyramids, tetrahedrons, cones, octahedrons and the like for approximation. This embodiment is especially useful when collisions are to be precluded to as great an extent as possible. In this case, for example, it may be determined whether the vehicle only grazes another object, instead of colliding therewith. This scenario can thus be taken into consideration. If the multiple first bodies contain the vehicle completely or entirely, any contact between the vehicle and other objects can be determined using the collision probability computed therefrom. Even though this embodiment is of interest for safety-critical scenarios, it may place increased requirements with regard to the available computing power in the individual case.

An additional or alternative embodiment of the method provides that the first and/or second indeterminacies are determined based on a Gaussian normal distribution and/or error propagation. The first and/or second indeterminacies result in particular from sensor data subject to error, externally transmitted pieces of information, which are likewise subject to error, and/or from a respective inertial uncertainty of the vehicle or of the object. In most instances, a Gaussian normal distribution of the measured values around an expected value may be assumed for a meaningful computation of the collision probability. If, for example, a temperature sensor registers a value of 19.5 degrees Celsius, the corresponding Gaussian normal distribution could result in a tolerance range of 19.0 to 20.0 degrees Celsius. A corresponding standard deviation as well as a confidence level to be predefined could likewise influence this tolerance range. Depending on the application, the indeterminacy resulting from the Gaussian normal distribution can be scaled using an additional factor. The first, second and/or third indeterminacies can be expressed in the form of an interval or tolerance range. In particular, intervals can thus be determined for the spatial position and the orientation. In the case of Cartesian space coordinates, a dedicated tolerance range can be determined for each space coordinate. If, for example, a space coordinate, such as the geodetic height z, depends on multiple sensor values, the indeterminacy for the geodetic height z can be determined by a corresponding error propagation.

The first and second indeterminacies of the first and second geometric bodies can in particular be mathematically expressed by means of a covariance matrix. In the case of a normal distribution of the position coordinates, the respective indeterminacy can be determined by way of the Gaussian linear error propagation. In particular proceeding from an uncertainty of the vehicle, the first indeterminacy of the at least one first geometric body is determined in the process. Proceeding from an uncertainty of the object, accordingly the second indeterminacy of the at least one second geometric body can be determined. Formula 6 in particular represents a sensor uncertainty or sensor measurement error. Formulas 7 to 9 relate in particular to spheres, serving as bodies, which are used for approximation. This can be represented, for example, by means of the following formula:

$$Z_{E/T} \sim N\left(\mu_{E/T}^{6\times1}, \sum\nolimits_{E/T}^{6\times6}\right); Z \sim N\left(\begin{pmatrix}\mu_E^{6\times1}\\\mu_T^{6\times1}\end{pmatrix}, \begin{pmatrix}\sum_E^{6\times6} & *\\ * & \sum_T^{6\times6}\end{pmatrix}\right) \quad \text{Formula 6}$$

$$Z_{c_{i/f}} = \begin{pmatrix}Z_{c_{i/f}x}\\Z_{c_{i/f}y}\\Z_{c_{i/f}z}\end{pmatrix} = f_{i/f}(X_{E/T}, Y_{E/T}, Z_{E/T}, A\alpha_{E/T}, B\beta_{E/T}, \Gamma\gamma_{E/T}, \vartheta(\cdot)) =$$

$$\begin{pmatrix}X_{E/T}\\Y_{B/T}\\Z_{E/T}\end{pmatrix} + R(\alpha, \beta, \gamma) \text{ distance} \quad \text{Formula 7}$$

$$\mu_{c_{i/j}} = f_{i/j}(\mu_E) \quad \text{Formula 8}$$

$$\sum\nolimits_{c_{i/j}} = \nabla f_{i/j} \sum\nolimits_E \nabla f_{i/j}^T \quad \text{Formula 9}$$

Formulas 6 to 9 relate in particular to spheres, serving as bodies, which are used for approximation. In Formula 7, 'distance' denotes a distance from centers of respective $$A\alpha_{E/T}, B\beta_{E/T}$$

$$z_E = \begin{pmatrix}x_E\\y_E\\z_E\\\alpha_E\\\beta_E\\\gamma_E\end{pmatrix}; z_T = \begin{pmatrix}x_T\\y_T\\z_T\\\alpha_T\\\beta_T\\\gamma_T\end{pmatrix}\begin{pmatrix}X_{E/T}\\Y_{E/T}\\Z_{E/T}\end{pmatrix}$$

associated indeterminacy regions. $X_{E/T}$, $Y_{E/T}$ and $Z_{E/T}$ represent in particular a spatial position of the vehicle or of the object, represent in particular an orientation of the vehicle or of the object in the space. An indeterminacy region can be represented in the form of ellipsoids. Formula 7 relates in particular to the case when the vehicle or object is initially approximated by a single main sphere, and thereafter by multiple sub-spheres. 'distance' is then in particular the distance between the indeterminacy of the main sphere and a respective indeterminacy of the particular sub-spheres. The parameter 'distance' with respect to multiple sub-spheres can be symmetrically selected, so that the first indeterminacy with respect to each sub-sphere is identical, and the transformation for the standardization of the third indeterminacy or for the conversion of the Minkowski difference to the computing body thus has to be computed only once. These aforementioned formulas proceed in particular from a normal distribution of the position coordinates and take a linear uncertainty propagation according to Gauss into consideration. In the process, it must be considered that a space pose of the vehicle or of the object is already six-dimensional since, in addition to the three space coordinates, also three orientation coordinates $\alpha$, $\beta$ and $\gamma$ are assumed. The same applies accordingly to the space coordinates of the object. The random vectors $z_{ci/j}$ as well as $\mu_{ci/j}$ and $\Sigma_{ci/j}$ can relate to arbitrary bodies.

Formula 10

$z_E$ and $z_T$ represent the respective position vectors of the vehicle and object without uncertainty. As a result of corresponding mapping rules according to Formula 6, the vectors $z_E$ and $z_T$ can be transformed with the aid of the random vectors $Z_E$ and $Z_T$. $Z_E$ and $Z_T$ contain in particular the uncertainty. The indeterminacy for the geometric bodies can be determined accordingly. $R(\alpha, \beta, \gamma)$ describes in particular a rotation matrix in the at least three-dimensional space as a function of the orientation coordinates or angles $(\alpha, \beta, \gamma)$.

The two vectors $z_E$ and $z_T$ can be combined into a shared vector z, which is then twelve-dimensional. In this case, z is a twelve-dimensional vector, and not the geodetic height. The following applies in this case:

$$z \in \mathbb{R}^{12} \text{ where } z=(z_E^T z_T^T)^T \qquad \text{Formula 11}$$

With respect to a sensor data function and prediction algorithms, random variables can be assumed to have a normal distribution.

The covariance matrices for the vehicle or for the object contain in particular the respective uncertainties of the underlying sensors or pieces of information. The regions of the matrices in Formula 6 denoted by a star are not relevant for further computation since these have no impact on the collision probability.

An additional or alternative embodiment of the method provides that the three-dimensional position of the object and/or the orientation are detected multiple times at different points in time, for determining a three-dimensional trajectory of the object, and one of multiple trajectories for the vehicle, which has the lowest collision probability, is selected as a function of the trajectory of the object. The orientation can have three degrees of freedom in the form of three angles. Due to the uncertainty or indeterminacy of the position of the object, or due to an indeterminacy regarding the behavior (action hypothesis) of the object, multiple trajectories may result for the object. So as to be able to reliably determine a trajectory of the object, in this case the three-dimensional position and/or orientation of the object are detected multiple times at different points in time. An object behavior to be expected can be taken into consideration for the determination of the three-dimensional trajectory. A probability function, serving as an action hypothesis, could describe the object behavior. This could be used with birds, for example. For example, based on object recognition or a posture of a bird, it can be determined whether this bird is remaining in place, beginning to fly or changing its flight path. Such different behaviors can additionally result in further trajectories of the bird. A corresponding analysis can also be carried out with other aerial vehicles or drones.

In some examples, multiple collision probabilities at multiple points can be summarized to a single collision probability for a trajectory. Multiple collision probabilities can thus be converted into one (overall) collision probability for a trajectory. Preferably, the trajectory that has the lowest collision probability is selected. For this purpose, in particular control signals are generated, which are designed to activate a corresponding actuator system of the vehicle so as to maneuver the vehicle along the trajectory having the lowest collision probability. The estimation of the behaviors of other objects can be mathematically expressed by an action hypothesis. The action hypothesis can be interpreted as a probability with which a certain action will be carried out. In the case of a bird, this would be a probability, for example, that the bird will fly away or not. This means that, in addition to the determination of the collision probability, additionally further probabilities with respect to the action hypotheses can be taken into consideration during the determination of the collision probability so as to identify and/or select the trajectory that has the lowest collision probability. With this, the safest flight trajectory can be selected for the vehicle.

In some examples, the collision probability may be determined in each case for multiple points of the trajectories for the vehicle. With this, it is possible not only to determine the collision probability at a possible collision point, but also to determine it along an entire trajectory. Likewise, an (overall) collision probability for the entire trajectory can be determined from multiple collision probabilities for the multiple points. The multiple points are preferably selected in the region that can be interpreted as a potential collision area. In this way, it can be ensured that the collision probability relates not just to a single point, but that the collision probability represents a trajectory for the vehicle.

In some examples, the vehicle and the object are each approximated by at least one polyhedron, and the set union of the computing bodies is approximated by means of a prism, wherein the prism completely contains the set union. The prism is preferably taken into consideration during the determination of the collision probability, instead of the set union. The prism may be configured to represent an approximation to the set union. The prism can in particular have a right and regular design. In some examples, the prism can be a minimal-volume, right prism that includes the set union. This means in particular that the prism is just large enough to completely include or contain the set union of the computing bodies. A cuboid can be selected, for example, the dimensions of which are just sufficient to completely include the set union of the computing bodies. Minimal-volume as used herein may be interpreted to mean that the prism that has the lowest possible volume is sought or selected, and entirely or completely contains the set union of the computing bodies.

For computing or determining the collision probability, the product of the probability density functions (according to Formula 4) over the volume of the set union can be added up or integrated. As an alternative, a probability density function regarding the third indeterminacy over the volume of the set union of the computing bodies or an approximation therefor may be added up or be (numerically) integrated. In the case of multiple third indeterminacies, a separate probability density function can be defined, determined and/or specified for each third indeterminacy. In the case of multiple third indeterminacies, multiple corresponding probability density functions can be taken into consideration for the determination of the collision probability. In this embodiment of the method, the vehicle and the object are preferably approximated by means of corresponding polyhedrons. In the case of overapproximation, the respective polyhedrons completely contain the vehicle or the object.

The computation of the collision probability can be reduced by one dimension by approximating the computing bodies by means of a bounding right, ideally minimal-volume, prism. In this way, all that may be required is to determine the probability density function merely over a surface area. Due to the right prism, the third dimension is easy to take into consideration.

All bodies for approximation are preferably convex. In some examples, all polyhedrons are convex. If no overestimation of the collision probability is required, arbitrary convex representations, that is, arbitrary convex polyhedrons, can be selected for the at least one first body and/or the at least one second body. A base of the prism is preferably parallel to a top. In this way, a volume that is easy to calculate can be created. So as to determine the collision probability, the volume of the prism, instead of the spatial union, can be used for determining the collision probability. The volume of the prism in particular represents an approximation to the set union. Since the volume of the prism completely contains the set unions, the collision probability is not underestimated. So as not to unnecessarily overestimate the collision probability, it is useful to accordingly select the prism to be a minimal-volume prism. The prism is thus preferably taken into consideration during the determination of the collision probability, instead of the set union.

As an alternative, a bivariate collision probability for a base area of the prism can be determined. In the case of a regular straight prism, the computation of the collision probability can be broken down into a two-dimensional component of the collision probability and a one-dimensional component of the collision probability. This makes it possible, in particular, to determine the two collision probabilities separately from one another, and then to merge these. In the case of the two-dimensional component of the collision probability, the collision probability is determined by way of a corresponding converse probability. This means that it is not a surface area within the prism, but a surface area outside the prism that is taken into consideration. A base area of a prism is in particular a polygon. The outside region of the polygon can be divided into corresponding angular segments by accordingly extending the lateral edges of the polygon. The surface area outside the polygon can in particular be taken into consideration during the computation of the two-dimensional component of the collision probability. These surface areas outside the polygon can be represented by the corresponding angular segments. The nature of the probability density function can be utilized in the process for the same to become increasingly smaller and drop to zero as the distance increases. This can be illustratively explained with the fact that the collision probability will be zero at some point as the distance increases.

The one-dimensional component of the collision probability can be determined by multiplication with a height or a difference with respect to a cumulative probability density function, wherein the difference of the cumulative probability density function is defined at different vertical positions. In Formula 12, $1-\Sigma P_i$ represents the two-dimensional component of the collision probability, $$\left[cdf\left(\max_z (P'')\right) - cdf\left(\min_z P''\right)\right]$$

and the term represents the one-dimensional component of the collision probability. In this way, the corresponding probability density function can be integrated or added for each angular segment around the polygon. In this way, a probability value can be determined, which indicates that no collision will occur. The collision probability, in contrast, corresponds exactly to the opposite event in this case. The third component of the three-dimensional space can be taken into consideration by means of a corresponding cumulative probability density function. This results in the following formula:

$$P(C) = \left[1 - \sum P_i\right] \cdot \left[cdf\left(\max_z (P^*)\right) - cdf\left(\min_z (P'')\right)\right] \quad \text{Formula 12}$$

$P_i$: with a probability corresponding to an angular piece;
$P''$: position within the prism.

$$\left[cdf\left(\max_z (P'')\right)\right]:$$

probability density function evaluated at a maximum position within the z direction within the prism, for example at a top area of the prism. The third dimension z is stochastically independent in the case of Formula 12. The index i indicates the respective angular segments around the polygon of the prism.

An additional or alternative embodiment of the method provides that the computing bodies are approximated by multiple prisms that make contact with one another. The prisms can in particular be symmetrical with respect to one another. The multiple prisms can be congruent with respect to one another. However, they may be shifted with respect to or offset from one another. In this case, the third dimension, which is usually the space coordinate z, is discretized, in particular to increase accuracy. Multiple prisms that make contact with one another represent the discretization in the spatial direction z. This means in particular that, after the Minkowski difference has been taken, not a single straight prism, but multiple straight, ideally minimal-volume, prisms that make contact with one another are determined or selected for enveloping. With this, the computing bodies can be bounded at smaller intervals as a function of the discretization steps. The collision probability can be computed analogously to the examples described above. Since, in general, the same uncertainty distribution is used as a basis for all prisms, the same transformation can be used for forming the computing bodies, and thus for determining the respective prisms. This means that the transformation required for the computing bodies ideally only has to be determined once.

As a result, an overapproximation of the collision area can be provided by the multiple prisms that make contact with one another, or the real collision probability can be approximated by a discretization of the 3rd dimension in multiple sub-prisms. The discretization allows or discretization steps allow, in particular, the computing time requirement and accuracy to be varied. In particular, a number of the prisms that make contact with one another, that is, the discretization, can be determined as a function of a digital resource, such as an available computing power, for example. The accuracy of the determination of the collision probability can thus be carried out even more precisely, while saving computing time at the same time.

An additional or alternative embodiment of the method provides that the vehicle and the object are each approximated by at least one sphere, and the set union of the computing bodies is approximated by a cuboid, wherein the cuboid completely contains the set union. The cuboid is preferably taken into consideration during the determination of the collision probability, instead of the set union. The cuboid represents in particular an approximation to the set union. The sphere is preferably an ideal geometric sphere. The vehicle or the object can be approximated by multiple spheres. In this embodiment of the method, it is in particular checked whether the at least one sphere for the vehicle could overlap, that is, collide, with at least one sphere of the object. It is in particular sufficient for this when at least one of the spheres of the vehicle overlaps with one of the spheres of the object. The collision probability is thus smaller than the collision probability of all possible variations of spheres of the vehicle to collide with the spheres of the object. This can be expressed by means of the following formula:

$$P(C) \leq P(C_{ms}) \quad \text{Formula 13}$$

$$P(C_{ms}) = P(\text{coll}(c_1,c_3) \lor \text{coll}(c_1,c_4) \lor (\text{coll}(c_1,c_5) \lor (\text{coll}(c_2,c_3) \ldots) \quad \text{Formula 14}$$

$P(C_{ms})$ represents the collision probability with respect to the multiple spheres, which overestimates the actual collision probability $P(C)$. The expression coll(i,j) expresses the event (here, the collision), and P(coll(i,j)) expresses the probability of the event, that is, the collision probability. The different collision events are generally not independent on one another. The probabilities of the intersections of the spheres are not known a priori. It is therefore, in general, not practical to evaluate the results separately. It is therefore also preferred in this case to find a respective third indeterminacy for each combination of the first indeterminacies of the spheres of the vehicle with the second indeterminacies of the object, and this third indeterminacy is subsequently standardized. The transformation required to do so is in particular used to compute or determine the respective computing body from the respective Minkowski difference. The united region of the computing bodies in particular forms the computing basis for the sought collision probability.

The uncertainty or indeterminacy of the respective spheres can be determined proceeding from the vehicle uncertainty. Corresponding to the normal distribution, this takes place in particular by way of the Gaussian linear uncertainty propagation. In the process, the aforementioned Formulas 6 to 9 can be used. In the case of these multiple spheres, each having a dedicated indeterminacy with respect to the coordinates x, y and z, it is now possible to take an accordingly high number of Minkowski differences. From a radius $r_i$ of the spheres of the vehicle and radius $r_j$ of the spheres of the object, in particular regions arise in each case as spheres in the origin with the radius $r=r_i+r_j$ as well as the uncertainties $\Sigma i, j$. The respective Minkowski differences in the three-dimensional space are in particular in each case spheres around the origin. Since spheres are completely symmetrical, orientation information may be neglected. If symmetrical arrangements of the multiple spheres are selected, in particular the transformations for the standardization of the third indeterminacy or the determination of the computing bodies are similar and, accordingly, only have to be calculated in a reduced manner.

The standardization of the third indeterminacy results in particular in the transformation that is used to determine the computing bodies. The set union of these computing bodies can be used to determine the collision probability. However, the computing complexity can be reduced by drawing an axially parallel polyhedron, that is, a cuboid, around the set union as an approximation. The cuboid should have a minimal-volume design, similarly to the example with the prisms. The probability resulting from the cuboid overestimates the collision probability again. Ideally, the determination of the collision probability, taking the cuboid into consideration, only results in minor overestimation of the collision probability, yet results in a considerably lower computing complexity. In the case of standardized normal distributions, all space coordinates are independent of one another. In this case, the probabilities for the x, y and z coordinates can be separately evaluated by way of the standardized distribution function. In this case, the distribution function is denoted by cdf and represents a cumulative probability density function. The collision probability based on the cuboid can be determined by way of the following formula:

$$P(C_{BB}) = \left[cdf\left(\max_x (D_v'')\right) - cdf\left(\min_x (D_v'')\right)\right] \cdot \quad \text{Formula 15}$$
$$\left[cdf\left(\max_y (D_v'')\right) - cdf\left(\min_y (D_v'')\right)\right] \cdot \left[cdf\left(\max_z (D_v'')\right) - cdf\left(\min_z (D_v'')\right)\right]$$

$D_v''$ is the volume area of the computing bodies. $\tilde{P}(C_{BB})$ is the collision probability, based the cuboid. cdf are the respective cumulative probability density functions.

In some examples, an object type of the object is detected by means of object recognition, and the second indeterminacy for the at least one second body is determined as a function of the object type. The object recognition can take place, for example, by means of a trained neural network. Depending on the object type, a different uncertainty may result for the object, and thus for the at least one second body. A drone, serving as the object, for example, has a different indeterminacy than a bird. The behavior of a bird is much more difficult to predict than that of a controlled drone. For example, a different drone may provide the intended flight path or trajectory thereof via an appropriate interface (Car-to-X communication). When the object type is a drone, the vehicle can assume that certain behaviors, such as sudden veering, are very unlikely. In the case of a bird, in contrast, it is initially not known how the bird will specifically behave in terms of the flight path thereof. These differing behaviors can be mathematically expressed with the aid of different action hypotheses. These different action hypotheses can, as was already explained, result in accordingly different collision probabilities for the trajectories. While a drone, for example, is unlikely to depart from the planned trajectory, this cannot be assumed in the case of a bird. Depending on the object type, the determination of the second indeterminacy can thus be adapted according to the project. With this, the determination or computation of the collision probability along a trajectory can become even more realistic.

In some examples, all bodies for approximating the vehicle and the object are convex. A body is in particular convex when the associated connecting line for all pairs of points of the convex body is situated completely within the body. With this, the computation of the collision probability can be designed to be more reliable and simpler. In the case of non-convex bodies, such as a hollow cylinder or a ring, for example, corresponding algorithms could produce unrealistic results or even cause the algorithm to crash. Even though this is not necessarily the case, it has been found that particularly high reliability can be achieved for the computation of the collision probability when using convex bodies for the approximation of the vehicle and/or of the object.

In some examples, a control signal for maneuvering the vehicle is generated and/or an information signal is output to an operator of the vehicle as a function of the determined collision probability. Accordingly, a control signal can be generated for a determined trajectory that has a low collision probability. As an alternative or in addition, the determined collision probability can be used for controlling the vehicle. The trajectory of the vehicle may be adapted in the process as a function of the determined collision probability. A control signal for maneuvering the vehicle is preferably generated for autonomous vehicles. This is the case with drones, for example. If, in contrast, the vehicle is an air taxi, which requires a vehicle operator, it may suffice to output an information signal to the vehicle operator instead of a control signal. The operator can accordingly control the vehicle, based on the information signal, in such a way that no collision occurs. In the case of the autonomously flying vehicle, the control signal is in particular designed to activate and to influence a corresponding actuator system of the vehicle so that a collision is safely avoided. When the vehicle is controlled by a pilot, it may be sufficient when a safety function is triggered. Depending on how likely the collision is, it may be additionally provided that a temporary automatic control is carried out, similarly to an emergency braking assistance system in cars.

FIG. 1, by way of example, shows a possible traffic situation for a vehicle 10. In addition to the vehicle 10, FIG. 1 shows two objects 20 and 25 as well as a car 30. Like the vehicle 10, the object 25 is likewise an aerial vehicle. In this example, the aerial vehicles are each designed as drones. The object 20 is a bird. FIG. 1 shows seven possible trajectories TR1 to TR7. The seventh trajectory TR7 indicates in which direction the car 30 will drive. Since the car 30 is not an aerial vehicle, the seventh trajectory TR7 is situated in the xy plane. FIG. 1 shows a Cartesian coordinate system KS having the usual axes x, y and z in this regard. The bird 20 has the sixth trajectory TR6, and the further drone, serving as object 25, can use two possible trajectories, these being the fourth and fifth trajectories TR4 and TR5. The vehicle 10 comprises a sensor unit 12, an interface 15 as well as a control unit 14. Multiple sensors can form the sensor unit 12. This can be, for example, a camera, a LIDAR sensor, a radar sensor, an ultrasonic sensor, a pressure sensor, a temperature sensor, a radiation sensor, a Venturi tube, a Pitot tube or other sensors for environment detection. The control unit 14 can comprise a microcontroller, a processor unit and/or a neural network. In the situation shown in FIG. 1, the vehicle 10 is to travel from the first point P1 to the second point P2. In particular collisions with the bird 20 and the other drone 25 are to be safely avoided in the process.

So-called Monte Carlo methods are frequently employed in the field of collision recognition. These Monte Carlo methods, however, are frequently very computationally intensive, and the computing run time is dependent on the number of samples. Moreover, the Monte Carlo method is a stochastic method and therefore not deterministic. It is not possible to estimate any lower or upper bounds. At the most, certain confidence intervals may be indicated. Other methods, in turn, attempt to compute the collision probability by means of accordingly adapted numerical integration. Such methods have thus far primarily failed since these are extremely computationally intensive and the computing run time is dependent on the number of discretization steps. Even though it is frequently possible to achieve a reduction of degrees of freedom through skillful transformations and conversions, this usually results in another disadvantage. In many instances, this comes at the expense of accuracy, as a result of which the collision probability is no longer realistically computed. If it is then attempted to restore this inaccuracy with accordingly finer discretization, this comes at the expense of the computing time. It is therefore extremely difficult to calculate or determine the collision probability reliably, that is, with sufficient accuracy and, at the same time, sufficiently quickly.

The method described in the present application offers a solution that provides a favorable compromise between the computing time and accuracy with respect to the determination of the collision probability. Moreover, many methods only explore collision avoidance in road traffic, and thus consider a collision only in the two-dimensional space. When collisions in the three-dimensional space are considered, this is frequently done without the observance of uncertainties UN. Still, it is important to take the uncertainty UN into consideration given the fact that the air space is becoming increasingly congested.

The vehicle 10 in FIG. 1 is a flying object, which can selectively be manned or unmanned. The vehicle 10 has three possible trajectories TR1, TR2 and TR3 available to choose from. The objective is to determine the trajectory for the vehicle 10 which can preclude a collision with the bird 20 or the other object 25 to as great an extent as possible. So as to achieve this, a criticality assessment of the particular selected trajectory $TR_i$ is required. The criticality assessment includes in particular the computation or determination of the collision probability. The collision probability is in particular determined for individual points of the trajectory. If the collision probability is determined for multiple points along the trajectory, it is possible to determine an overall collision probability for the corresponding trajectory therefrom.

In FIG. 1, the second trajectory TR2 shows a few points by way of example. In the case of FIG. 1, the second trajectory TR2 is selected. This second trajectory TR2 is the trajectory of the three trajectories TR1 to TR3 which has the lowest collision probability. Along this trajectory, it is thus extremely unlikely that a collision with the object 'bird' 20 or the other drone 25 will take place. In the case of an unmanned vehicle or an autonomous vehicle including occupants, it may in particular be provided to completely avoid a collision. In the case of a manned vehicle 10, however, it may be provided that only a warning is provided to an operator of the vehicle 10 so as to defuse critical situations beforehand.

Figure 2:
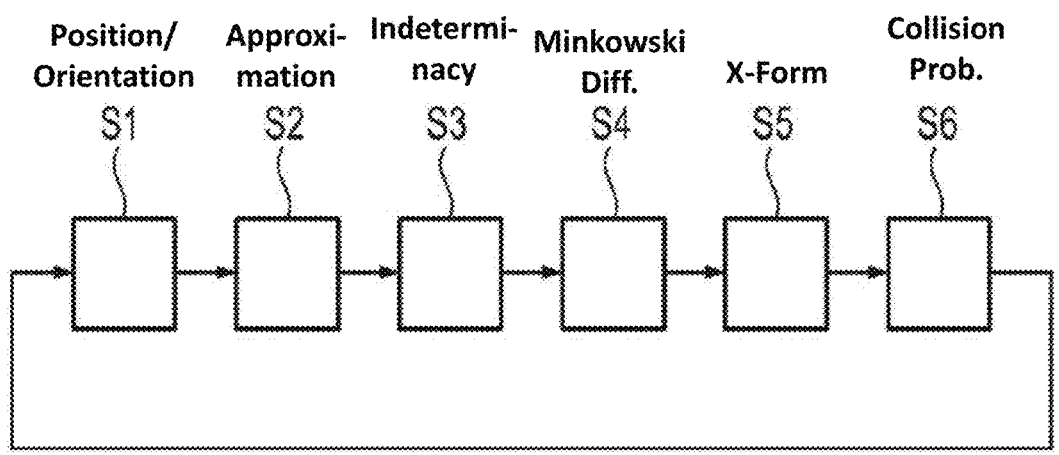
FIG. 2 shows an exemplary flow chart of a method according to some aspects of the present disclosure.

FIG. 2 shows an exemplary flow chart of a possible method In a first step S1, a three-dimensional position x, y, z and an orientation $\alpha$, $\beta$, $\gamma$ of the vehicle 10 and of the object 25 are detected or received. The orientation of the vehicle 10 and of the object can in particular be three-dimensional. The orientation information can thus have three angles. In a second step S2, the vehicle 10 is approximated by at least one first geometric body $c_i$, $py_i$. The vehicle 10 is thus represented, approximated and/or depicted by the at least one first geometric body $c_i$, $py_i$. The at least one first geometric body $c_i$, $py_i$ contains at least a portion of the vehicle 10. The object 20, 25 can be accordingly approximated in an analogous manner.

In a third step S3, a first indeterminacy US1 and a second indeterminacy US2 are determined and/or predefined. The first indeterminacy US1 relates to the first body, and the second indeterminacy relates to the second body. In a fourth step S4, a Minkowski difference D' is taken for each combination of the at least one first geometric body $c_i$, $py_i$ for the vehicle 10 with the at least one second geometric body $c_j$, $py_j$ for the object 20, 25. This can result in multiple Minkowski differences D'. In a fifth step S5, a third indeterminacy US3 can be computed from the respective first indeterminacy US1 and the second indeterminacy US2, for example by adding the first and second indeterminacies. The third indeterminacy US3 can be standardized by a corresponding transformation TN. Furthermore, in the fifth step S5, the same transformation TN that was used to standardize the third indeterminacy US3 can be applied to the associated Minkowski difference D'. This is used to obtain respective computing bodies BK. In a sixth step S6, the collision probability of the vehicle 10 with the object 20, 25 can be determined based on a spatial union D" of the computing bodies BK. In particular, respective probability density functions for the vehicle 10 and the object 20, 25 can be taken into consideration.

In a dynamic environment, the behavior of other traffic participants or objects 20, 25 is frequently unknown. The environment of the vehicle 10 can therefore in particular be cyclically detected by means of the sensor unit 12 or the interface 15. The detected states of the individual objects 20, 25 can be predicted into the future. Based on this information, a movement or trajectory can be planned. The trajectory $TR_i$ thus determined can be relayed to an actuator system or to the control unit 14 for implementation. This may take place, in particular, in the form of control signals. The movement planning or trajectory planning should in particular carry out the criticality assessment, which should preferably take place in real time, as is described in the present application. In the process, it applies in particular to take the uncertainty UN of the sensor unit 12 as well as the prediction into consideration. The criticality is in particular expressed or mapped by the collision probability.

The control unit 14 can in particular take the behavior of the other objects 20, 25 into consideration for determining the collision probability for the trajectories TR1 to TR7. The behavior of the other objects 20, 25 can be mathematically expressed by means of so-called action hypotheses. Multiple action hypotheses of other multiple objects 20, 25 can be considered in a discretized manner. In particular, the following formula can be used for this purpose.

$$P(h_{TR2}) = \sum_i \sum_k \sum_g p(h_{g,k}) \cdot p(C_{i,g,k}) \quad \text{Formula 16}$$

The following applies in Formula 16: $P(h_{TR2})$ represents the collision probability for the second trajectory TR2. $p(h_{g,k})$ represents the probability that a hypothesis g of the object k occurs. $p(C_{i,g,k})$ represents the collision probability with the object k. The method is in particular directed at the computation of $p(C_{i,g,k})$. $p(C_{i,g,k})$ can be considered as a local or instantaneous collision probability at the point in time or time step i. If additionally the probability of the hypothesis $p(h_{g,k})$ is taken into consideration, it is possible to compute the probability for the second trajectory $P(h_{TR2})$ over multiple points in time ti. The probability for the hypothesis $p(h_{g,k})$ can, for example, map the probability with which the object will behave.

Likewise, the trajectory TR1 can be broken down into multiple points in time ti. At a lower level, an instantaneous collision probability can thus be determined at a point in time ti between two objects. This is, in particular, the collision probability between the vehicle 10 and the object 20, 25. Thereafter, the respective individual probabilities of multiple points in time ti can be added up to form an overall probability for the second trajectory TR2. Proceeding from the collision probability for a certain spatial point or point in time ti, it is thus likewise possible to determine a collision probability for an entire trajectory TR1.

FIG. 3 shows by way of example a possible method for determining the collision probability, in which the vehicle 10 and the object 25 are approximated by means of multiple spheres $c_i$. The vehicle 10 is described by means of the vector $z_E$ for the vehicle 10, and the object 25 is described by means of the vector $z_T$ (see Formula 10).

In this way, a system having twelve degrees of freedom can be formulated for the vehicle 10 and the object 25. This can take place with the aid of Formula 11, in which the vector z is twelve-dimensional.

In reality, however, the determination or estimation of the state of an object is always subject to uncertainty. This is subject to uncertainty UN. The uncertainty UN is indicated in FIG. 3a by means of dotted ellipses. The multiple shown ellipses around the vehicle 10 or the object 25 represent ellipsoids having a corresponding 3D orientation. The uncertainty UN or the different indeterminacies US1, US2, US3 should be understood to be three-dimensional. The ellipsoids are only shown as two-dimensional ellipses for the sake of clarity or a simplified illustration. For the same reasons, the Minkowski difference D' shall likewise be regarded as a circle instead of a sphere. The standardized third indeterminacy US3 in FIG. 3c is shown as a dotted circle. In this case as well, the third indeterminacy US3 represents a sphere. In FIG. 3a, the vehicle 10 has three ellipses, which in reality are ellipsoids. Each of these ellipses or ellipsoids represents a corresponding confidence interval.

The disclosures made previously with regard to confidence intervals can be applied to FIGS. 3a to 3d.

The uncertainty UN can result from inertial uncertainty, a measurement error, faulty sensor data, and the like. The spheres $c_i$ shown in FIG. 3b likewise cannot be exactly localized. These are subject to the first indeterminacy US1 or second indeterminacy US2. Taking in each case the associated first or second indeterminacy US1 or US2 into consideration for all twelve degrees of freedom, this likewise results in a twelve-dimensional random vector Z. With respect to sensor data fusion and prediction algorithms, the particular random variables can normally be assumed to have a normal distribution. The random vector Z can be determined analogously to Formulas 6 to 9.

$$Z = \begin{pmatrix} z_E^{6\times 1} \\ z_T^{6\times 1} \end{pmatrix} =: \Omega \to \mathbb{R}^{12} \quad \text{Formula 17}$$

The collision probability can be determined using the following equations.

$$P(C) = \int_D p_Z(z)dz, \text{ where } D = \{z_E \in Z_E, z_T \in Z_T | \vartheta(z_E) \wedge \vartheta(z_T) \neq \emptyset\} \quad \text{Formula 18}$$

The capital letter D represents a global domain of integration for a collision, $\vartheta(z_E)$ represents a set of points in the space taken up by the vehicle 10 as a function of the vector $Z_E$. The same applies accordingly to $\vartheta(z_T)$. In the event that the probability functions for the vehicle 10 and the object 25 are independent of one another, a dedicated probability density function can be used in each case for the vehicle 10 and the object 25. Formula 5 shows an exemplary computing option for this case.

Hereafter, the determination of the collision probability is illustratively explained based on FIGS. 3a to 3d with the aid of the spheres $c_i$, serving as geometric bodies, which approximate the vehicle 10 and the object 25. FIGS. 3a to 3d can thus illustratively explain how Formula 4 can be effectively and efficiently evaluated. FIG. 3a shows the vehicle 10 and the object 25. These two items are spaced apart at a distance that is large enough to safely preclude a collision. A respective uncertainty UN of the three-dimensional spatial position x, y, z is schematically indicated by means of multiple ellipses. This means that the vectors $z_E$ and $z_T$ are each slightly blurred due to the uncertainty UN. In the case of an approximation using spheres $c_i$, this is not even necessary since the spheres c, are also identical when rotated. A sphere thus, in particular, has no orientation information.

Figure 3B:
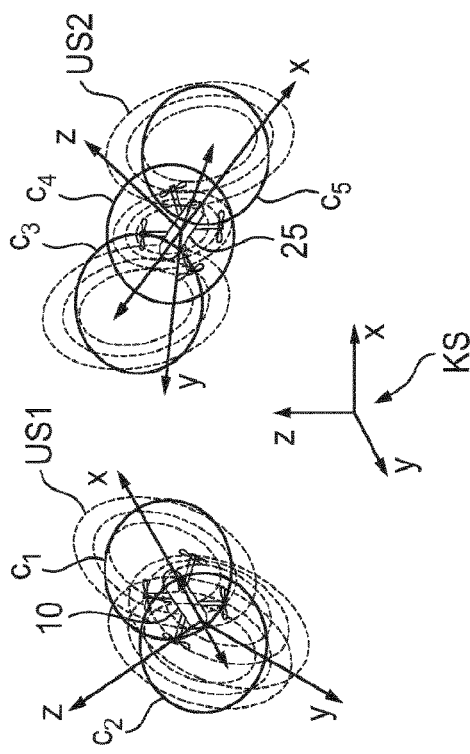
FIG. 3 shows an exemplary illustration of a method in which the approximation of the vehicle and of the object is carried out using multiple spheres, according to some aspects of the present disclosure.

It is apparent in FIG. 3b that the vehicle 10 was approximated by means of two spheres c1 and c2, and the object 25 was approximated by means of three spheres c3, c4 and c5. The first indeterminacy US1 and the second indeterminacy US2 can be derived from the uncertainty UN. In the example of FIG. 3b, the respective multiple spheres $c_i$ completely bound the vehicle 10, and the multiple spheres $c_j$ completely bound the object 25. It shall be assumed in the example of FIG. 3b that the vehicle 10 is still located sufficiently far away from the object 25 to be able to preclude a collision. If the object 25 approaches the vehicle 10 further, a collision can no longer be precluded. FIG. 3b shows an overapproximation. In this case, the real, actual collision probability is overestimated slightly. A collision can occur when at least one combination of spheres of the vehicle 10 collides with a further sphere of the object 25. This can be mathematically represented by Formulas 13 and 14.

FIG. 3c, on the left by way of example, shows a single Minkowski difference D' in the form of a sphere around the origin. Normally, a separate Minkowski difference D' is taken for every combination of sub-spheres. However, for the sake of clarity, only a single Minkowski difference D' is shown. In FIG. 3c, it is assumed that the object 25 and the vehicle 10 have further approached one another. In addition to the Minkowski difference D', multiple third indeterminacies US3 are indicated. Since the vehicle is approximated by 2 spheres c1, c2 and the object 20 is approximated by three spheres c3, c4, c5, a total of six possible combinations result. This results in six Minkowski differences D', and likewise in six third indeterminacies US3.

Assuming a radius $r_i$ for the spheres $c_i$ of the vehicle 10 and a radius $r_j$ for the spheres $c_j$ of the object 25, the Minkowski difference D' is in particular a sphere that has the radius $r=r_i+r_j$. The Minkowski difference D' furthermore has the third indeterminacy US3, which is a sum of the respective first indeterminacy US1 and the second indeterminacy US2. Ideally, it is attempted to select symmetrical arrangements of the multiple spheres $c_{i,j}$. In this case, some computing steps or arithmetic operations are similar to one another and accordingly only have to be carried out in a reduced manner.

The third indeterminacies US3 are standardized in the further course of the process by the transformation TN. This is shown in FIG. 3c. This standardization in particular results in a unit sphere around the origin from each respective third indeterminacy US3. Since multiple third indeterminacies US3 are being standardized, accordingly multiple unit spheres arise. With the same radius, the multiple unit spheres may overlap, so that only a single sphere is visible.

Figure 3D:
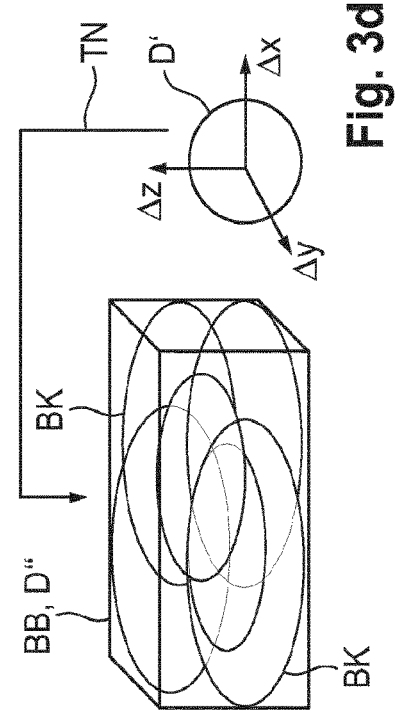
Figure 3A:
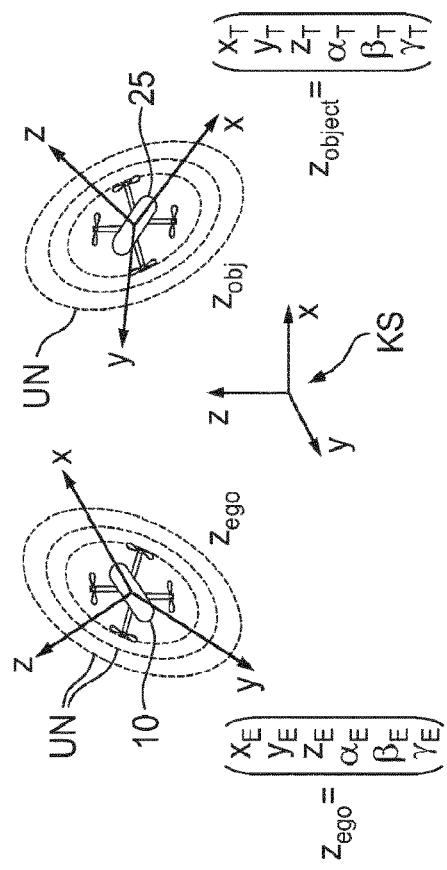
Figure 3C:
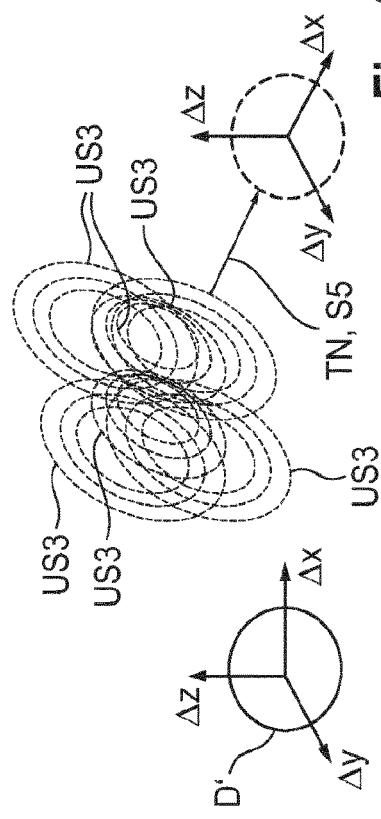

This transformation TN is used to form or determine the computing bodies BK. For this purpose, the same transformation TN that is used for the standardization of the third indeterminacy US3 is applied to the Minkowski difference D' associated with the respective third indeterminacy. This is indicated in FIG. 3d. The transformation TN can be a matrix, which includes stretching, distortion, translation, reflection, compression and the like. The same transformation TN that transformed the third indeterminacy US3 into a unit sphere transforms the respective Minkowski difference D' into the respective computing body BK. A separate transformation TN may be necessary for each Minkowski difference D' or for each third indeterminacy US3. In the case of FIG. 3, there are six Minkowski differences D', and thus six transformations TN. Due to symmetrical arrangements of the geometric bodies $c_i$, $py_i i$, the number of the transformations TN can be reduced or the computing complexity can be reduced. A set union D" of these multiple ellipsoids, which represent the computing bodies BK, forms the basis for computing the collision probability. The probability density functions for the vehicle 10 and the object 25 can be integrated or added over the area of the set union D".

Figure 4:
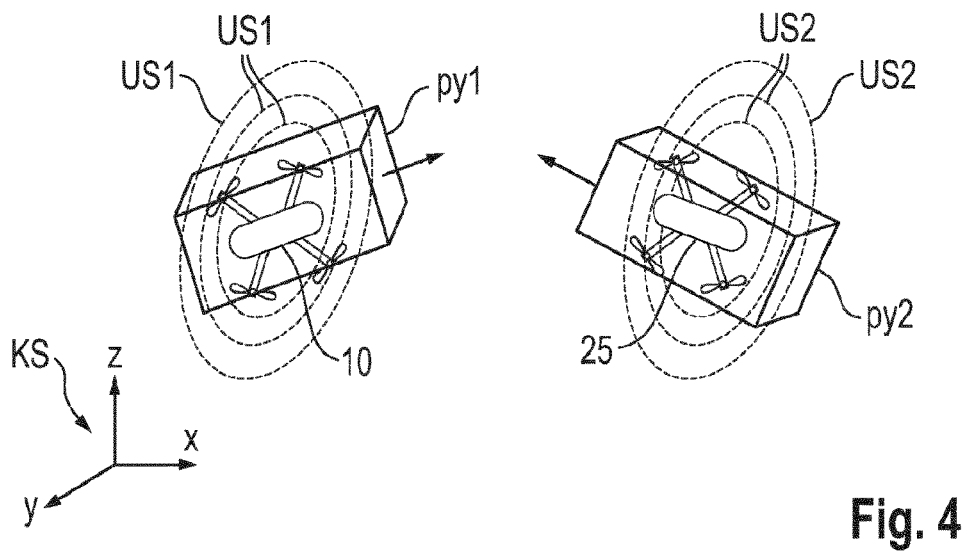
FIG. 4 shows an exemplary illustration of an approximation of the vehicle and of the object by means of polyhedrons according to some aspects of the present disclosure.

The set union D", however, is not always easy to mathematically capture due to the multiple ellipsoids. For this reason, in some examples, a cuboid BB is placed around the multiple ellipsoids in this case. Ideally, the cuboid BB completely includes the entire set union D". At the same time, the cuboid BB is not selected too large, that is, preferably has a minimal-volume design. Even though the collision probability is thus slightly overestimated, the computing complexity is drastically reduced. In the case of standardized normal distributions, the coordinates x, y, z are independent of one another. The probabilities in the x, y and z directions can thus be separately evaluated by way of the standardized distribution function cdf. The distribution function cdf corresponds to the cumulative probability density function. This takes place in particular by way of Formula 15:

FIG. 4 again shows the vehicle 10 and the object 25. In contrast to FIG. 3, the vehicle 10 and the object 25 are not approximated by multiple spheres $c_{i,j}$, but by a first polyhedron py1 and a second polyhedron py2. In the case of FIG. 4, these polyhedrons $py_{i,j}$ are designed as cuboids BB. In principle, the method for computing or determining the collision probability takes place in a manner similar to that described in FIGS. 3a to 3d. FIG. 4 corresponds to FIG. 3b, with the proviso that polyhedrons $py_{i,j}$ are used for the approximation instead of spheres. The comments made with regard to FIGS. 3a to 3d apply likewise to polyhedrons $py_{i,j}$ that are used for approximation. However, minor deviations result, which are shown with the aid of FIG. 6.

Figure 6:
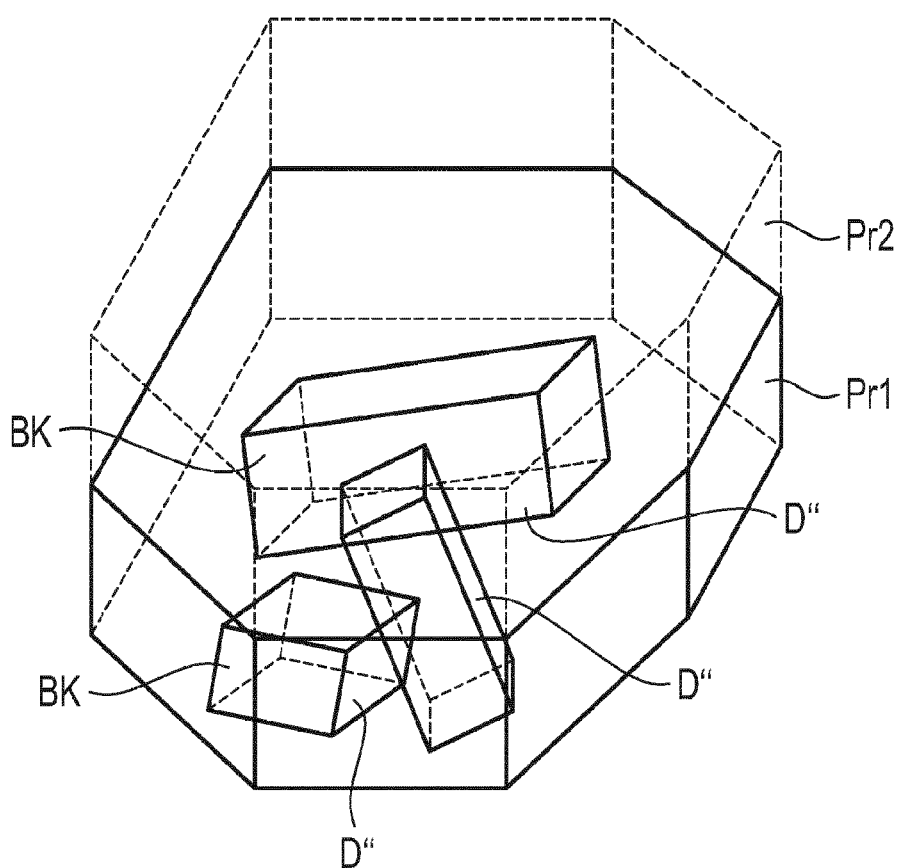
FIG. 6 shows an exemplary illustration for the approximation of the computing bodies using one or more straight prisms according to some aspects of the present disclosure.

FIG. 6 shows a first prism PR1 and a second prism PR2. The second prism PR2 is only indicated with dotted lines. Three cuboids BB are apparent within the first prism PR1. These three cuboids BB represent the respective computing bodies BK. The volumes of these three cuboids BB together represent in particular the set union D". These three cuboids BB can in particular intersect or overlap. In the example of FIG. 3d, the set union D" can likewise be approximated by means of a simpler geometric body. In the example of FIG. 6, however, this is not a cuboid, but the first prism PR1. Ideally, this is a straight, minimal-volume prism PR1 that completely includes the set union D". In FIG. 6, the first prism PR1 is shown slightly larger for the sake of clarity. The base area and top area of the first prism PR1 as well as of all further prisms $PR_i$ are preferably positioned parallel to one another. The collision probability can be computed in this case by integration of the probability density functions for the vehicle 10 and the object 25 over the volume of the first prism PR1. As an alternative, the collision probability can be computed by way of the corresponding converse probability. Formula 12 may be resorted to in the process.

As an alternative, the computing bodies BK can be discretized by means of multiple prisms. In FIG. 6, the second prism PR2 is hinted at by way of example. The second prism PR2 can be shifted in relation to the first prism PR1, in contrast to what is shown, while still being parallel to the first prism PR1. The second prism PR2 can be shifted in relation to the first prism PR1, with both prisms still making contact with one another. After the computing bodies BK have been formed, it is not a single straight prism PR1 that is selected, but multiple, ideally minimal-volume prisms PR$_i$ that make contact with one another, for enveloping the computing bodies BK. As a result, the computing bodies BK can be bounded at smaller intervals as a function of the discretization steps. The multiple polyhedrons py$_{i,j}$ frequently have the same first or second indeterminacy US1, US2. For multiple Minkowski differences D', the same transformation TN can thus result for multiple prisms PR$_i$. Ideally, the transformation TN only has to be determined once.

Figure 5A:
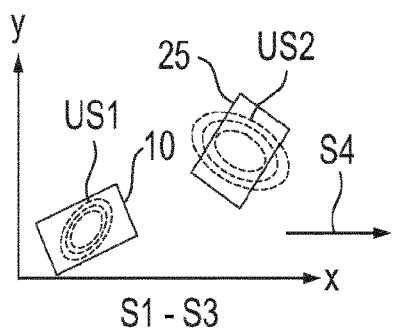
FIG. 5 shows an exemplary two-dimensional illustration for taking the Minkowski difference as well as for standardizing a third indeterminacy and for forming a computing body according to some aspects of the present disclosure.
Figure 5B:
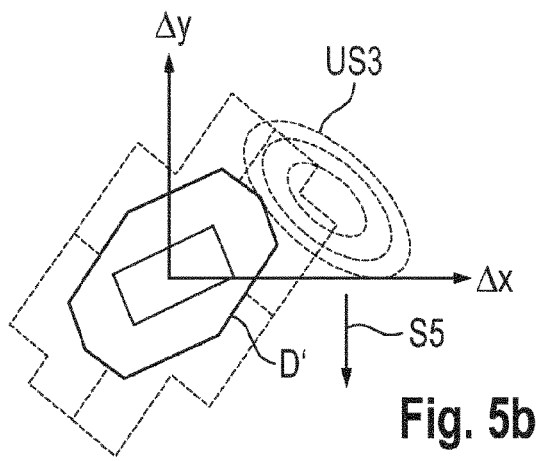

For further explanation, FIG. 5 schematically shows a determination of the collision probability in the two-dimensional space by way of example. FIG. 5a schematically shows method steps S1 to S3. Two objects are approximated by means of a rectangle. The respective first or second indeterminacy US1. US2 is shown by respective ellipses. The underlying covariance matrices as well as normal distributions are two-dimensional. The transition from FIG. 5a to FIG. 5b represents in particular the fourth step S4 of the method. This corresponds to taking the Minkowski difference D'. It is schematically apparent that the two rectangles were shifted multiple times for mapping the Minkowski difference D'. The third indeterminacy US3 in FIG. 5b is preferably the sum of the first indeterminacy US1 and the second indeterminacy US2. Since FIG. 5b shows the Minkowski difference D', the coordinate axes are relative coordinates.

Figure 5C:
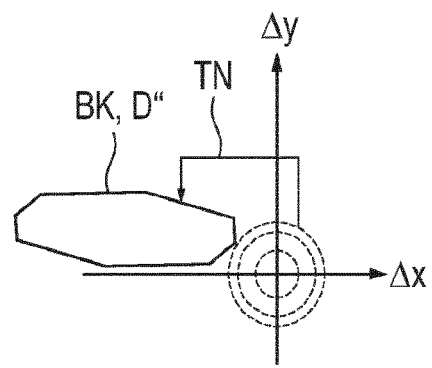

The transition from FIG. 5b to 5c represents in particular the fifth step S5, which is the standardization of the third indeterminacy US3. The process of standardizing causes the elliptical third indeterminacies US3 to be transformed into unit circles around the origin. Each transformation TN, which generates the standard circle and the origin from the arbitrarily arranged ellipse, can likewise be applied to the Minkowski difference D'. The result is in particular the computing body BK. In the process, multiple computing bodies BK can result or arise based on multiple transformations TN. It is clearly apparent that, after the third indeterminacy US3 has been standardized, the third indeterminacy US3 is no longer an ellipse, but in each case a circle around the origin (FIG. 5c). The transformation TN required for this can encompass a translation, a rotation and/or scaling. The same transformation TN which transformed the third indeterminacy US3 from an ellipse into a circle and the origin is applied accordingly to the Minkowski difference D'. This results in the computing body BK according to FIG. 5c. In this case, the computing body BK likewise corresponds to the set union D''. The process of standardizing is a known method or procedure in stochastics. However, based on FIG. 5, the process of standardizing can be shown slightly more clearly, in particular by means of the transition from FIG. 5b to FIG. 5c.

Overall, the present disclosure shows that, using the technologies and techniques disclosed herein, the collision probability can be determined with a considerable computing advantage over other methods, such as, for example, Monte Carlo methods or other numerical integration methods. In complex systems with real-time requirements, which must check a large number of different trajectories for collisions, these advantages also make it possible to use the collision probability instead of binary collision checks, and thus to suitably map uncertainties in the decision process. In sum, a computing run time advantage thus exists, with high accuracy. For closed mobility services, which also include aerial vehicles, the transition between the domains 'road' and 'air space' can thus be designed to be safe. The requirement to determine the collision probability quickly and safely results in particular from increasing congestion of the air space. In contrast to other methods, the present disclosure offers a deterministic method for determining the collision probability, the computing run time of which can be estimated. Moreover, the computing run time according to the method and the present disclosure is considerably reduced compared to other methods for computing the collision probability. In this way, the associated collision probability can be determined for each of a plurality of trajectories TR1. This decreased computing run time makes it possible to determine a trajectory for the vehicle 10 in real time.

The following symbols are used in the application. Additionally, the variables for the respective formula are explained. The index E relates to the vehicle. Corresponding symbols for the object ($Z_T$, $\vartheta(z_T)$, and the like) have the index T:

A, B: set A or B
$\mu_E$: expected value for the random vector $Z_E$
$\Sigma$: covariance matrix for the random vector Z
$\Sigma_E$: covariance matrix for the random vector $Z_E$
$Z_E$: random vector of the vehicle vectors
$\vartheta(z_E)$: set of points taken up by the vehicle as a function of the vector $z_E$
$pz_E(z_E)$: probability density function of the random vector $Z_E$ as a function of the vector $z_E$
$P_{z(z)}$: probability density function for the random vector Z as a function of the state (vector) z
$z_E$: vector of vehicle
$pz_E(Z_E)$: probability density function for the random vector $Z_E$ as a function of the vector $z_E$
$R(\alpha,\beta,\gamma)$: rotation matrix
distance: distance from centers of associated indeterminacies of different geometric bodies

LIST OF REFERENCE NUMERALS 10 vehicle
20 object, bird
25 object, drone
TR$_i$ respective trajectory
KS Cartesian coordinate system
P1 first point
P2 second point
12 sensor unit
14 control unit
15 interface

The invention claimed is:

1. A method for determining a collision probability of a vehicle with an object in a three-dimensional airspace and enabling collision avoidance, comprising:
receiving a three-dimensional position and orientation of the vehicle and of the object, the position comprising x, y, and z coordinates;
approximating the vehicle by at least one first geometric body, wherein the at least one first geometric body includes a portion of the vehicle;
approximating the object by at least one second geometric body, wherein the at least one second geometric body includes a portion of the object;
determining a first indeterminacy of the at least one first geometric body;
determining a second indeterminacy of the at least one second geometric body;
taking a Minkowski difference for each combination of the at least one first geometric body with the at least one second geometric body;
determining a respective third indeterminacy for each Minkowski difference as a function of the respective first indeterminacy of the at least one first geometric body and the respective second indeterminacy of the at least one second geometric body, the third indeterminacy based on a covariance matrix;

standardizing the respective third indeterminacy using a respective transformation;

applying the respective transformation to the respective taken Minkowski difference to determine respective computing bodies from the respective Minkowski difference;

determining the collision probability of the vehicle with the object based on a set union of the computing bodies; and using the determined collision probability to control the vehicle in real-time to avoid a collision with the object by at least one of maneuvering the vehicle along a trajectory or outputting an information signal to an operator of the vehicle.

2. The method according to claim 1, wherein a volume of the at least one first and second geometric bodies are determined as a function of a digital resource.

3. The method according to claim 2, further comprising detecting an object type of the object using object recognition, and determining the second indeterminacy for the at least one second body as a function of the object type.

4. The method according to claim 2, wherein the respective computing bodies for approximating the vehicle and the object are convex.

5. The method according to claim 1, wherein
the at least one first geometric body completely contains the vehicle, and the at least one second geometric body completely contains the object, or
the at least one first geometric body underapproximates the vehicle, and the at least one second geometric body underapproximates the object.

6. The method according to claim 1, wherein the first indeterminacy and/or the second indeterminacy are determined based on a Gaussian normal distribution and/or error propagation.

7. The method according to claim 1, wherein
the three-dimensional position and/or orientation of the object is detected multiple times at different points in time for determining a three-dimensional trajectory of the object, and
one of multiple trajectories for the vehicle, which has the lowest collision probability, is selected as a function of the trajectory of the object.

8. The method according to claim 1, wherein the collision probability is determined for multiple points of the trajectories for the vehicle.

9. The method according to claim 1, wherein the vehicle and the object are each approximated by at least one polyhedron, and the set union of the computing bodies is approximated via a prism, the prism completely containing the set union, and used for determining the collision probability.

10. The method according to claim 1, further comprising approximating the computing bodies by multiple prisms that contact one another, the prisms being symmetrical with respect to one another.

11. The method according to claim 1, further comprising approximating each of the vehicle and the object by at least one sphere, and approximating the set union of the computing bodies by a cuboid, the cuboid completely containing the set union, and used for determining the collision probability.

12. The method according to claim 1, wherein using the determined collision probability to control the vehicle comprises at least one of generating a control signal to maneuver the vehicle along a trajectory to avoid the object or outputting an information signal to an operator of the vehicle via a display or audio device to prompt manual avoidance of the object.

13. An apparatus for determining a collision probability of a vehicle with an object in a three-dimensional airspace and enabling collision avoidance, comprising:
at least one sensor unit for detecting a three-dimensional position and orientation of the vehicle and of the object via an interface-(15), the position comprising x, y, and z coordinates;
a control unit, operatively coupled to the at least one sensor unit, wherein the control unit is configured to
approximate the vehicle by at least one first geometric body, wherein the at least one first geometry body includes a portion of the vehicle;
approximate the object by at least one second geometric body, wherein the at least one second geometric body includes a portion of the object;
determine a first indeterminacy of the at least one first geometric body;
determine a second indeterminacy of the at least one second geometric body;
taking a Minkowski difference for each combination of the at least one first geometric body with the at least one second geometric body;
determine a respective third indeterminacy for each Minkowski difference as a function of the respective first indeterminacy of the at least one first geometric body and the respective second indeterminacy of the at least one second geometric body, the third indeterminacy based on a covariance matrix;
standardize the respective third indeterminacy using a respective transformation;
apply the respective transformation to the respective taken Minkowski difference to determine respective computing bodies from the respective Minkowski difference;
determine the collision probability of the vehicle with the object based on a set union of the computing bodies; and
use the determined collision probability to control the vehicle to avoid a collision with the object by at least one of maneuvering the vehicle along a trajectory or outputting an information signal to an operator of the vehicle.

14. The apparatus according to claim 13, wherein a volume of the at least one first and second geometric bodies are determined as a function of a digital resource.

15. The apparatus according to claim 13, wherein
the at least one first geometric body completely contains the vehicle, and the at least one second geometric body completely contains the object, or
the at least one first geometric body underapproximates the vehicle, and the at least one second geometric body underapproximates the object.

16. The apparatus according to claim 13, wherein the first indeterminacy and/or the second indeterminacy are determined based on a Gaussian normal distribution and/or error propagation.

17. The apparatus according to claim 13, wherein
the three-dimensional position and/or orientation of the object is detected multiple times at different points in time for determining a three-dimensional trajectory of the object, and one of multiple trajectories for the vehicle, which has the lowest collision probability, is selected as a function of the trajectory of the object.

18. The apparatus according to claim 13, wherein the collision probability is determined for multiple points of the trajectories for the vehicle.

19. The apparatus according to claim 13, further comprising detecting an object type of the object using object recognition, and determining the second indeterminacy for the at least one second body as a function of the object type.

20. A computer-readable medium including program instructions on a storage medium, configured for determining a collision probability of a vehicle with an object in a three-dimensional airspace and enabling collision avoidance, comprising:

instructions for receiving a three-dimensional position and orientation of the vehicle and of the object, the position comprising x, y, and z coordinates;

instructions for approximating the vehicle by at least one first geometric body, wherein the at least one first geometry body includes a portion of the vehicle;

instructions for approximating the object by at least one second geometric body, wherein the at least one second geometric body includes a portion of the object;

instructions for determining a first indeterminacy of the at least one first geometric body;

instructions for determining a second indeterminacy of the at least one second geometric body;

instructions for taking a Minkowski difference for each combination of the at least one first geometric body with the at least one second geometric body;

instructions for determining a respective third indeterminacy for each Minkowski difference as a function of the respective first indeterminacy of the at least one first geometric body and the respective second indeterminacy of the at least one second geometric body, the third indeterminacy based on a covariance matrix;

instructions for standardizing the respective third indeterminacy using a respective transformation;

instructions for applying the respective transformation to the respective taken Minkowski difference to determine respective computing bodies from the respective Minkowski difference;

instructions for determining the collision probability of the vehicle with the object based on a set union of the computing bodies; and instructions for using the determined collision probability to control the vehicle to avoid a collision with the object by at least one of maneuvering the vehicle along a trajectory or outputting an information signal to an operator of the vehicle.

* * * * *